United States Patent [19]

van Namen

[11] Patent Number: 5,231,336
[45] Date of Patent: Jul. 27, 1993

[54] ACTUATOR FOR ACTIVE VIBRATION CONTROL

[75] Inventor: Frederik T. van Namen, Danville, Calif.

[73] Assignee: Harman International Industries, Inc., Northridge, Calif.

[21] Appl. No.: 816,658

[22] Filed: Jan. 3, 1992

[51] Int. Cl.$^5$ .............................. H02K 35/00
[52] U.S. Cl. .............................. 318/128; 310/12; 310/15; 310/127
[58] Field of Search ............. 318/128, 127; 310/156, 310/157, 12, 13, 14, 15, 26, 27, 28, 36

[56] References Cited

U.S. PATENT DOCUMENTS

| | | | |
|---|---|---|---|
| 1,912,167 | 5/1933 | Anderson | 310/12 |
| 3,119,940 | 1/1964 | Pettit et al. | 310/26 |
| 3,135,880 | 6/1964 | Olson | 310/14 |
| 3,148,292 | 9/1964 | Bergslein et al. | 310/13 |
| 3,202,886 | 8/1965 | Kramer | 335/234 |
| 3,590,293 | 6/1971 | Susdorf | 310/177 |
| 3,790,834 | 2/1974 | Tanaka | 310/162 |
| 4,363,980 | 12/1982 | Petersen | 310/15 |
| 4,459,500 | 7/1984 | Miyamoto | 310/154 |
| 4,508,988 | 4/1985 | Reiss et al. | 310/154 |
| 4,529,270 | 7/1985 | Moss et al. | 318/128 |
| 4,612,592 | 9/1986 | Frandsen | 360/106 |
| 4,692,999 | 9/1987 | Frandsen | 29/596 |
| 4,820,949 | 4/1989 | Mizobuchi et al. | 310/92 |
| 4,868,431 | 9/1989 | Karita et al. | 310/12 |
| 4,868,432 | 9/1989 | Frandsen | 310/12 |
| 4,876,472 | 10/1989 | Shiraki et al. | 310/154 |
| 4,885,489 | 12/1989 | Stuhr | 310/78 |
| 4,924,123 | 5/1990 | Hamajima et al. | 310/15 |
| 5,095,238 | 3/1992 | Suzuki et al. | 310/156 |
| 5,113,104 | 5/1992 | Blaettner et al. | 310/154 |
| 5,138,209 | 8/1992 | Chuta et al. | 310/67 R |

FOREIGN PATENT DOCUMENTS

| | | | |
|---|---|---|---|
| 3824257 | 1/1990 | Fed. Rep. of Germany | 310/14 |
| 8102501 | 3/1981 | Japan . | |
| 0141769 | 11/1981 | Japan | 310/12 |
| 0059064 | 4/1984 | Japan | 310/12 |
| 0039255 | 2/1989 | Japan | 310/12 |
| 0197249 | 8/1990 | Japan | 310/12 |
| 0981439 | 1/1965 | United Kingdom | 310/15 |

Primary Examiner—Steven L. Stephan
Assistant Examiner—Thomas M. Dougherty
Attorney, Agent, or Firm—Jones, Day, Reavis & Pogue

[57] ABSTRACT

An electromagnetic actuator is disclosed which is especially suitable for active vibration control applications. The actuator may be either of the moving coil or moving magnet type so that a moving element undergoes reciprocal motion in response to an electrical input signal. The invention allows the force of the moving element to be linearly related to the amplitude and direction of the input current with a high degree of efficiency. In one embodiment, the moving element is decoupled from any mechanical load so as to produce reaction forces which may be used to cancel vibrational forces.

14 Claims, 4 Drawing Sheets

ACTUATOR FOR ACTIVE VIBRATION CONTROL

FIELD OF THE INVENTION

The present invention relates to linear actuators generally and, in particular, actuators suitable for the use in an active vibration control system.

BACKGROUND

Numerous methods and techniques have been devised in the past to alleviate the problem of unwanted vibrations produced by such sources as vibrating machinery. Although such vibrations cannot usually be completely eliminated by any means, any attenuation of the vibrations is desirable in order to both lessen their destructive effects and increase human comfort.

The earliest attempts to control vibration represent what may be termed "passive" vibration control systems. In such a system, energy damping elements or materials are arranged so as to absorb the unwanted vibrations and dissipate them as heat. Sound insulation and automobile shock-absorbers are two common examples. Other passive vibration control systems include energy-storing elements such as springs which present a reactive load to the vibrating source. For example, large motors are sometimes mounted on springs which have a spring constant chosen in accordance with the frequency at which the motor is known to vibrate. Such springs, by storing and re-emitting the vibrational energy, essentially serve as mechanical filters to lessen the vibrational force transmitted to the surface upon which the motor is mounted.

More recently, improved systems for vibration control have appeared which may be termed "active" vibration control systems. Such systems utilize an actuator for producing vibrations to cancel out the unwanted vibrations, the actuator being under the control of a feedback control system with a vibration sensing means for deriving the error signal used to drive the actuator. Examples of such active systems are found in the U.S. Pat. Nos. 4,566,118 and 4,490,841, the disclosures of which are hereby incorporated by reference.

It is imperative in active vibration control systems that the actuator be capable of producing vibrations in strict accordance with the input signal used to drive the actuator. That is, the preferred relationship between the input signal and the vibrational force produced by the actuator should be a linear one. One type of electromagnetic actuator which is very suitable for vibration control applications is the moving coil type of arrangement commonly used to drive loudspeakers. In such an actuator, an input current is applied to a solenoidal coil which is subjected to a constant magnetic field directed perpendicularly to the direction of the current within the coil. The coil thus experiences a force which is proportional to the input current and directed perpendicularly to the direction of both the magnetic field and current. In the case of loudspeakers, the moving coil (a.k.a. the voice coil) is attached to a diaphragm for producing sound waves in accordance with the input signal. In the case of a motor or actuator, on the other hand, the moving coil is mounted around a slidably mounted shaft which undergoes reciprocating motion in correspondence to the input current. A variation of the moving coil type of actuator involves the placement of one or more stationary coils around a slidably mounted shaft upon which is mounted a permanent magnet. The N-S pole of the magnet is coaxial with the slidably mounted shaft and the surrounding coil. Applying current to the stationary coil causes a magnetic field to be produced which moves the shaft in one direction or the other with a force proportional to the input current applied to the coil.

As aforesaid, for active vibration control applications, an actuator needs to respond in as linear a fashion as possible to its driving input signal. To obtain such a linear response, several design considerations arise. First, the force experienced by the moving element (i.e., the moving coil or moving permanent magnet) should be the same for a given amount of input current irrespective of the moving element's position along its line of travel. This means that ideally the magnetic field produced by the permanent magnet should be uniform all along the stroke of the actuator.

Second, the coil current should follow the input voltage signal as closely as possible. The coil to which the input voltage signal is applied, however, is an inductive load which means that the coil current cannot change instantaneously in response to a change in the input signal voltage. Rather, the coil current responds with a time constant proportional to the inductance of the coil. For linear operation, this time constant should be as small as possible which means the inductance should be minimized.

Third, physical law says that a current-carrying conductor subjected to a constant magnetic field experiences a force proportional to the magnitude of the current. In order to increase the efficiency of the actuator, a suitable flux path should be provided which concentrates the constant magnetic field produced by the permanent magnet and causes it to be directed perpendicularly toward the coil. This maximizes the force experienced by the coil (or magnet in the case of a moving magnet type actuator) for a given amount of coil current and permanent magnet strength.

The current which flows through the actuator coil, however, itself produces a magnetic field which changes the field produced by the permanent magnet. In order to maintain the proportionality between input current and force, the change of the field produced by the magnet should be eliminated, resulting in a force per unit of current which is independent of the amount and direction of the current.

Several prior devices described in the literature represent attempts to partially solve the problems mentioned above. For example, U.S. Pat. No. 4,692,999, issued to Frandsen, describes an electromagnetic actuator of the moving coil variety which uses dual coils and permanent magnets in order to more nearly maintain the uniformity of the magnetic field irrespective of coil position. Japanese Patent Application No. WO81/02501 discloses an electromagnetic transducer wherein a compensating coil is mounted coaxially with the moving coil in order to produce a magnetic field in opposition to that produced by the moving coil. U.S. Pat. No. 3,202,886, issued to Kramer, discloses an actuator of the moving permanent magnetic type for two-position operation which makes use of two oppositely energized coils. None of these references, however, teach or suggest an actuator which overcomes the aforementioned problems to the extent necessary for active vibration control applications.

SUMMARY OF THE INVENTION

The present invention is an electromagnetic actuator for achieving the design objectives enumerated above. In a first embodiment, the actuator comprises a permanent magnet structure mounted on a shaft which is situated within a magnetically permeable housing which is open at both ends along the axis of the shaft. The shaft is mounted at each end within nonmagnetic endcaps mounted at each open end of the housing. The permanent magnet structure is magnetized in the axial direction. Two or more field coils are wound around a non-magnetic bobbin mounted coaxially within the housing. The coils are electrically connected so that, when driven by an input current, the coils produce magnetic fields in opposition to one another. The resulting forces cause the permanent magnet structure to be driven in one direction or the other, depending upon the polarity of the input current. Each pole of the permanent magnet structure is placed in close proximity to a field coil so as to leave a small magnetic air gap. The housing, with its nonmagnetic endcaps, provides a flux path for the magnet structure which concentrates the field and causes it to be directed perpendicularly within the air gap toward the field coils.

In a second embodiment, a plurality of field coils are wound around a magnetically permeable cylinder mounted coaxially on a shaft. The shaft is mounted within a magnetically permeable housing which is open at both ends along the axis of the shaft, with the shaft mounted within nonmagnetic endcaps as in the first embodiment. Mounted on the inner periphery of the housing are annular permanent magnets corresponding to each field coil and magnetized in the radial direction. As in the first embodiment, the field coils are electrically connected so that, when driven by an input current, the coils produce opposing magnetic fields. The coils and shaft are moved in one direction or the other depending upon the polarity of the input current. The housing, with its nonmagnetic endcaps, and cylinder provide a flux path which serves to concentrate and direct perpendicularly the permanent magnet field within the air gap between the cylinder and the housing, with the field coils situated within that air gap.

Either of the embodiments described above is particularly suitable for active vibration control when the housing of the actuator is mounted stationarily between a vibrating and a non-vibrating surface. The actuator is then driven with an input current signal so as to oppose the vibrations of the vibrating surface by means of a feedback control system. When the actuator shaft is connected to the vibrating surface, the operating force is directly applied to that surface. When the actuator shaft is left free to slide in reciprocal fashion, on the other hand, the mass reaction force opposes the vibrations. If the total mass mounted on (or integral with) the actuator shaft within the housing is large enough, the reciprocating motion of the moving element causes a significant reaction force on the actuator housing due to conservation of momentum. This reaction force is then applied to the surfaces in a manner which tends to prevent the transmission of vibrations from the vibrating to the non-vibrating surface.

Other objects, features, and advantages of the invention will become evident in light of the following detailed description considered in conjunction with the referenced drawings of a preferred exemplary embodiment according to the present invention.

DETAILED DESCRIPTION OF THE INVENTION

Figure 1:
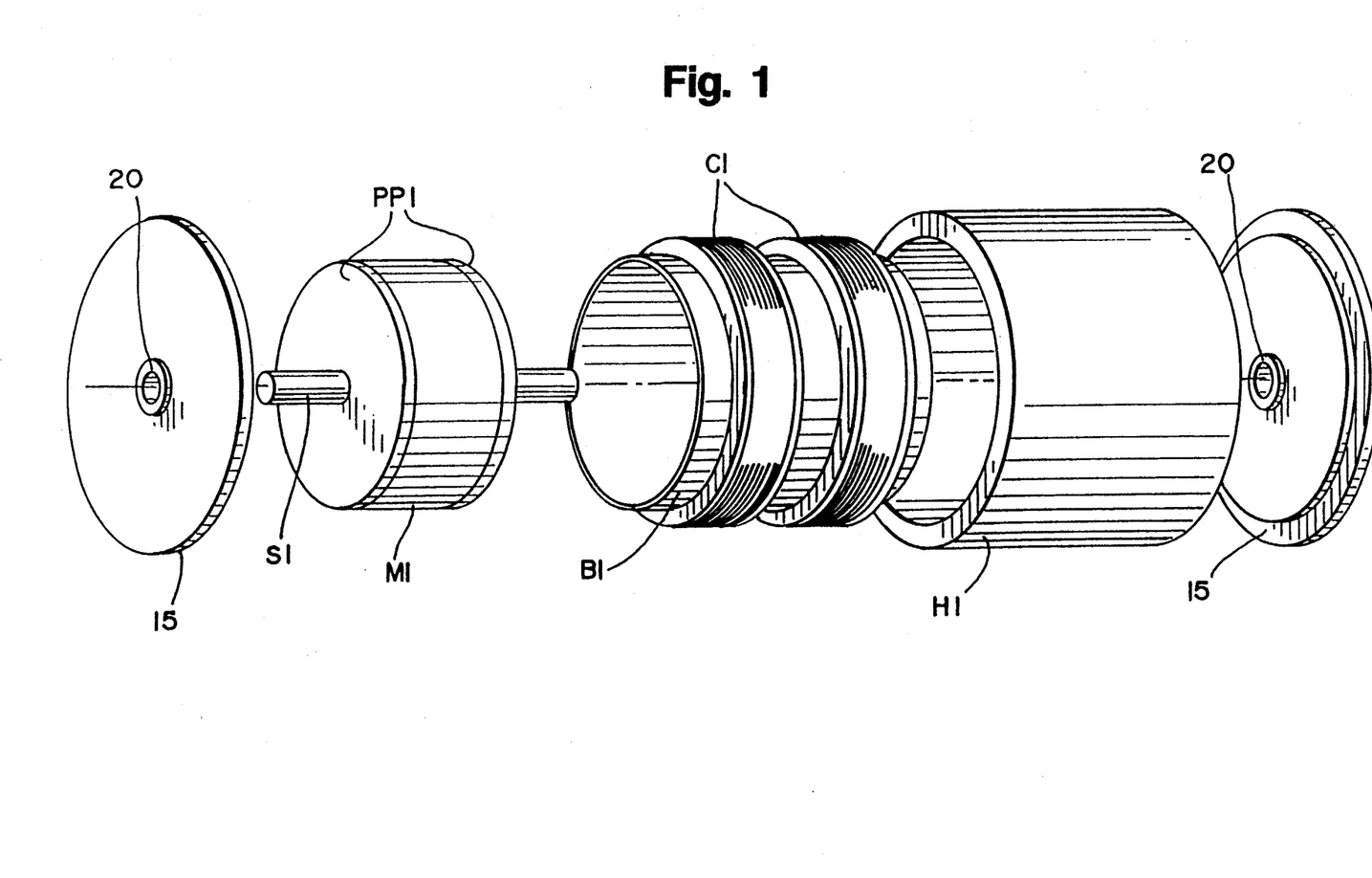
FIG. 1 is an exploded view of a moving magnet embodiment.
Figure 2:
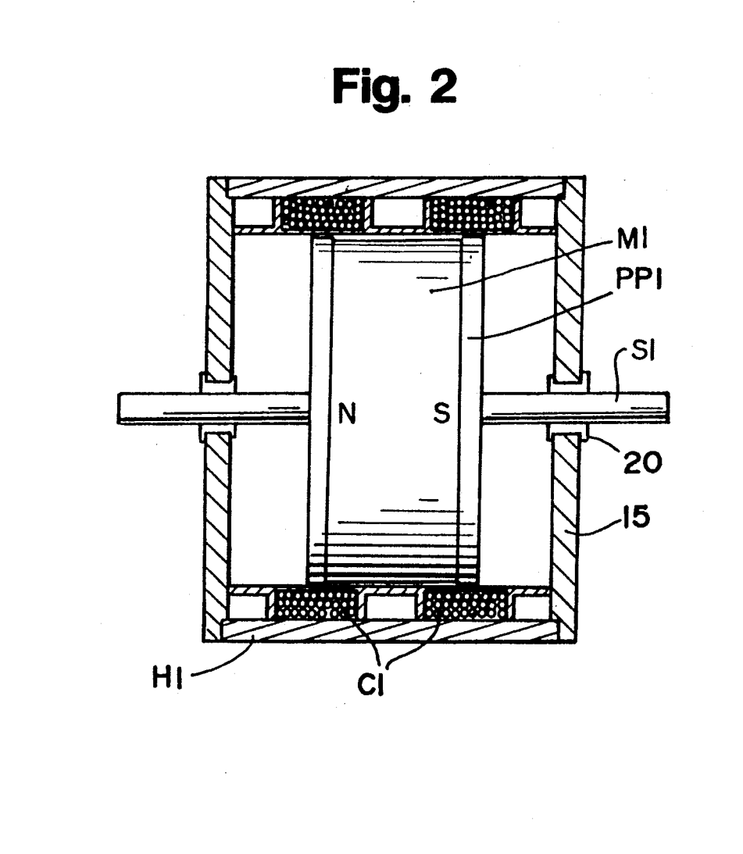
FIG. 2 is a sectional view of the embodiment shown in FIG. 1.

Referring first to FIGS. 1 and 2, there is shown an embodiment of the present invention which is of the moving magnet type. A permanent magnet structure or armature M1 is mounted on an actuator shaft S1 and magnetized in an axial direction. The shaft S1 is slidably mounted at its ends within a magnetically permeable housing H1 which is open at both ends along the axis of the shaft S1 The armature M1 is a magnet stack which contains one or more coaxially positioned permanent magnets and two or more pole plates PP1. A plate PP1 is placed between each magnet and at either end of the magnet stack. In case of more than one magnet, the magnets are stacked on the shaft S1 in such a way that equal magnetic poles face each other. The armature M1 in this embodiment is cylindrical with a circular cross-section but could be of any arbitrary shape.

Two or more solenoidal coils C1 are wound on a non magnetic bobbin B1 mounted within the housing H1. The coils C1 are spaced from each other in an axial direction so as to form rings on the bobbin B1. The inside diameter fits around the magnet structure M1 with some minimal diametrical clearance so as to allow free axial motion of the armature structure M1. The outside diameter of the bobbin B1 fits snugly inside the cylindrical steel housing H1. The coils C1 are electrically connected with each other in such a way that an electrical current flowing through adjacent coils C1 will create opposing magnetic fields.

The open ends of the cylindrical outer housing H1 are closed off with non magnetic endcaps 15 at each end with a sleeve bearing 20 in the center of each endcap 15. The housing H1 is made of magnetically soft steel while the endcaps 15 are made of aluminum or other non-magnetic material. The bearings 20 guide the actuator shaft S1 and center the armature M1. When an electrical input current is applied to the coils C1, the armature M1 is subjected to reciprocal forces in accordance with the input current signal.

The magnetically permeable housing H1, nonmagnetic endcaps 15, and nonmagnetic bobbin B1 cause the field produced by the magnet stack to be concentrated and directed more perpendicularly toward the coils C1.

Figure 3:
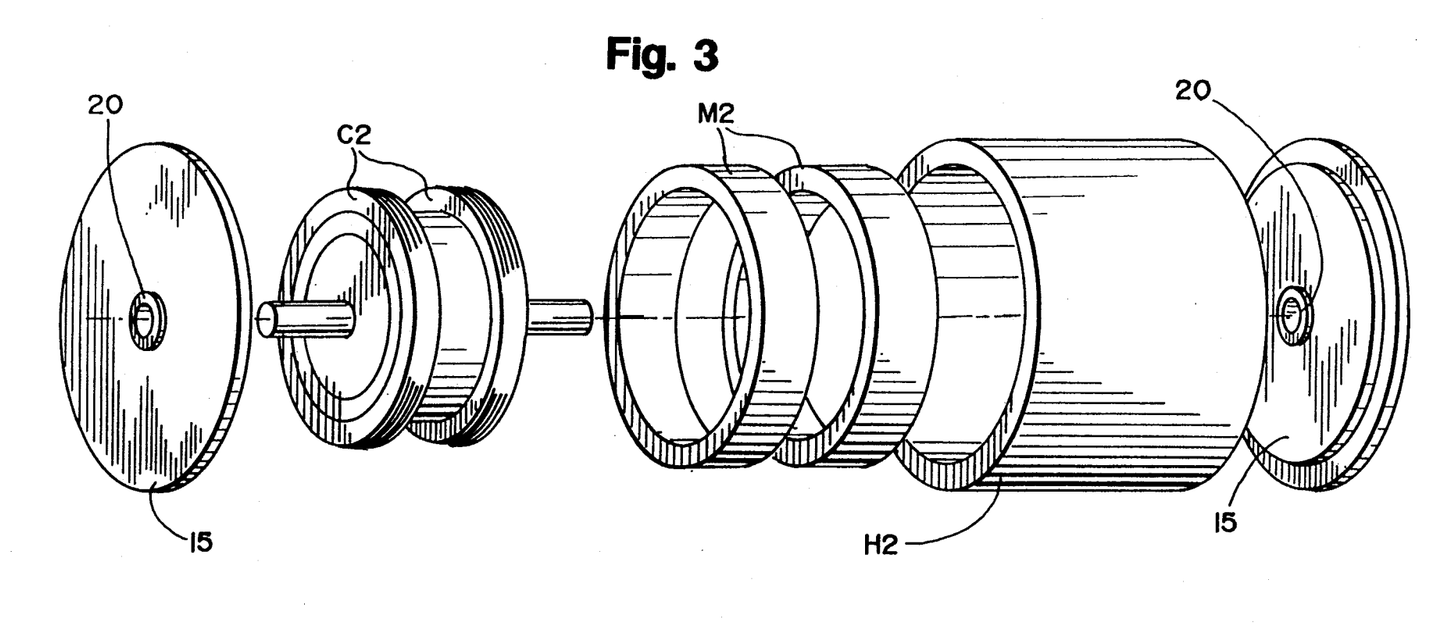
FIG. 3 is an exploded view of a moving coil embodiment.
Figure 4:
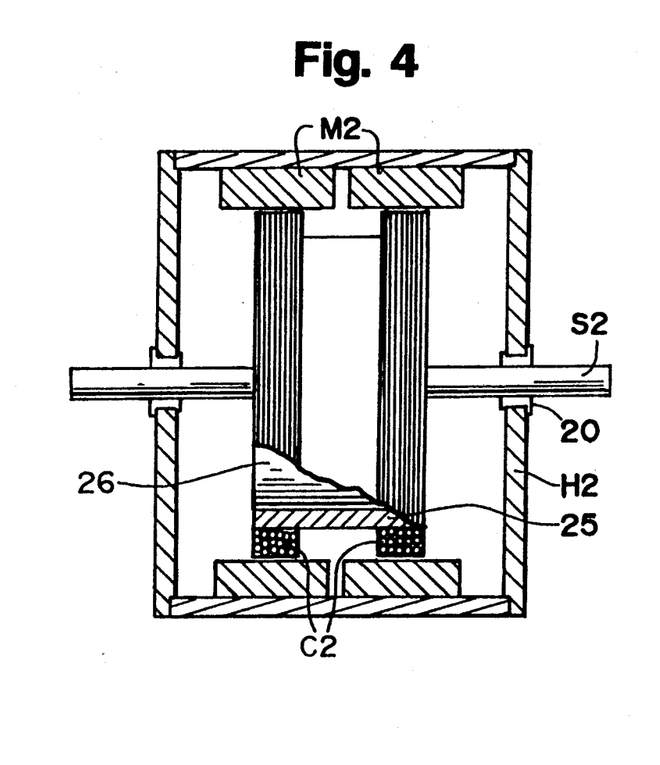
FIG. 4 is a sectional view of the embodiment shown in FIG. 3.

Referring next to FIGS. 3 and 4, there is shown another embodiment of the present invention which is of the moving coil type. Two or more annular magnet segments M2 are attached on the inside of an outer housing H2 made of highly magnetically permeable material such as magnetically soft steel. The housing H2 is closed at each end with non-magnetic endcaps 15. The magnets M2 are magnetized in a radial direction. Adjacent magnets M2 have their N-S poles oriented in opposite directions.

Two or more field coils C2 are wound on a thin walled magnetic steel cylinder 25. A non-magnetic core 26 occupies the center of the cylinder 25. The coils C2 are spaced from each other with a non-magnetic material 27. An actuator shaft S2 is mounted in the center of the core 27 and shaft S2 is slidably mounted within the housing H2 by means of sleeve bearings 20 in each endcap 15. The coils C2 are electrically connected so that an input current applied to the coils creates opposing magnet fields in each adjacent coil C2 which also causes the field coils C2 to undergo reciprocal motion in accordance with the input signal. The housing H1 cylinder 25, and nonmagnetic endcaps 15 provide a magnetic flux path for the magnets M2 which concentrates and directs perpendicularly their fields toward the coils C2.

In either of the embodiments described above, by enclosing the magnets with a material having high magnetic permeability (i.e., housing H1 or H2), most of the magnetic flux is guided through the magnetic gap in which the coils C1 or C2 are placed. Only very little flux will leak past this gap, thus creating a highly efficient electromagnetic actuator. In the case of the first embodiment, all the flux in the pole plates PP1 is guided through the coils. In the second embodiment, the cylinder 25 provides a low reluctance pathway for the flux produced by the magnets M2. In both embodiments, the nonmagnetic endcaps 15 help to direct the permanent magnet flux perpendicularly toward the coils C1 or C2.

Each of the embodiments of the present invention also provides an actuator which presents a low inductance load to the electrical input signal. Since the change in input current due to a change in the input voltage signal occurs with a time constant proportional to this inductance, reducing this inductance results in a more linear relationship between the input signal and the force applied to the moving element. The inductance is reduced by electrically connecting adjacent coils in series so as to create opposing magnetic fields. An inductive coupling between adjacent coils occurs due to a linkage of magnetic fields created when a current runs through the coils. When the direction of the current in two adjacent coils is the same, the resulting magnetic fields are added and the total inductance of the combination is double the inductance of a single coil. When the currents run in opposite directions, the induced magnetic fields oppose each other which reduces the total inductance. Since the electrical time constant is proportional to the total inductance, it follows that the time constant is also thereby reduced. This effective reduction in total inductance is enhanced the better is the flux linkage between the coils. The above-described embodiments achieve a high degree of flux linkage between adjacent coils by providing a low reluctance pathway inside the coils.

The embodiments described above also provide an actuator where the force on the moving element (i.e., either the coil or the magnet) due to a given input current is independent of the position of the moving element along its stroke path. This is achieved in the first embodiment by providing coils C1 adjacent to each pole of the magnets making up the armature M1. Similarly, in the second embodiment, an annular magnet M2 is provided adjacent each of the coils C2. By properly manipulating the dimensional relations of the coils and the pole plates the magnetic flux flowing through the coils can be made constant over the length of the moving element's stroke.

Figure 5:
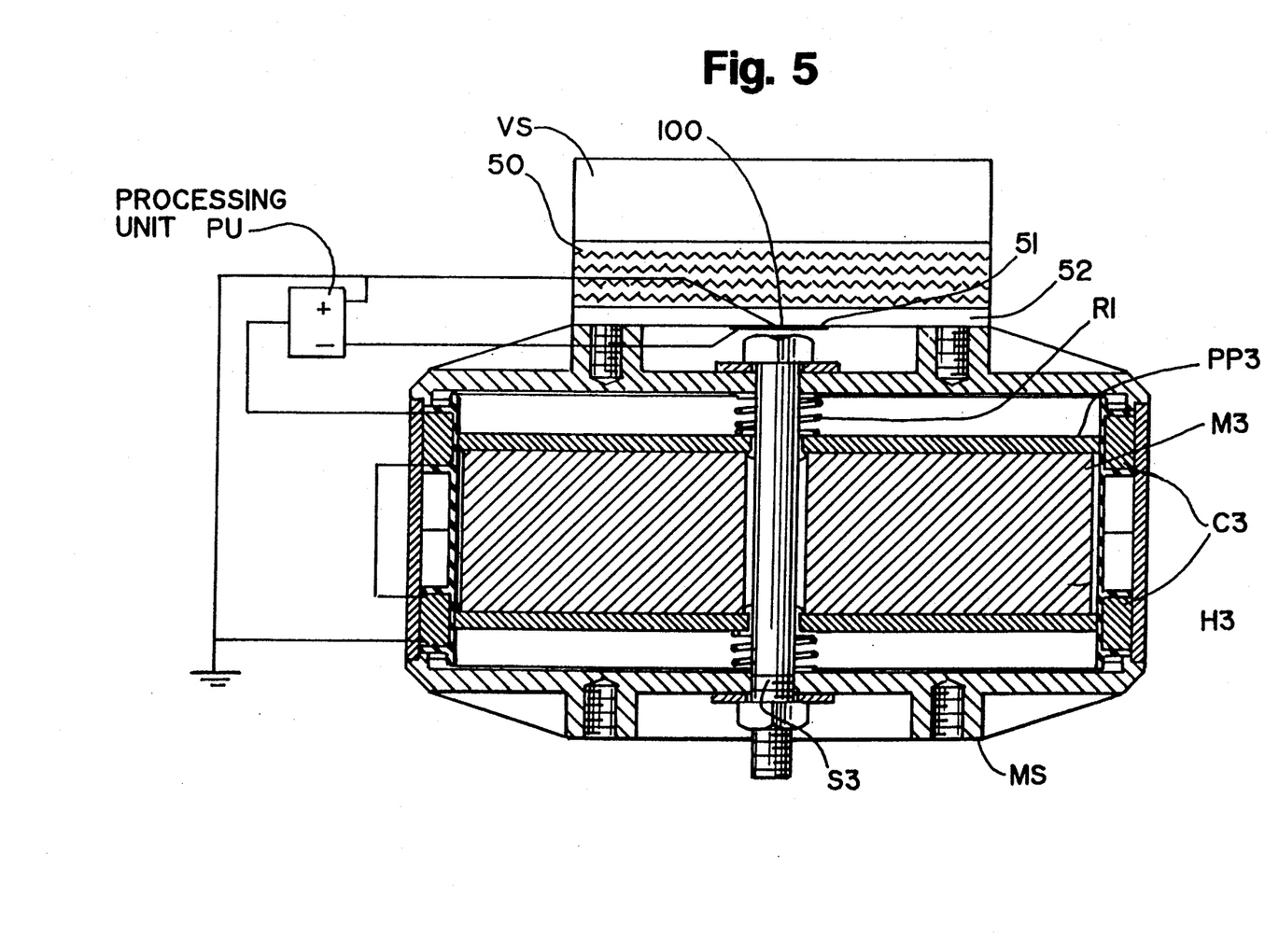
FIG. 5 shows an embodiment of the invention particularly suitable for vibration control.

Referring next to FIG. 5, there is shown an embodiment of the present invention which is especially suitable for active vibration control applications. The actuator shown is of the moving magnet type as described earlier with reference to FIGS. 1 and 2. Accordingly, the actuator comprises a housing H3 having mounted there within field coils C3 electrically connected so as to create opposing magnetic fields when an electrical input signal is applied to the coils. The magnetic armature M3 is magnetized in the axial direction so that the magnetic fields produced by the current-carrying coils C3 produce a force on the armature M3. As in the earlier embodiment, the housing H3 and pole plates PP3 provide a low reluctance pathway for the magnetic flux. In this embodiment, however, the shaft S3 is mounted stationarily within the housing H3 while the armature M3 is slidably mounted on the shaft. The armature M3 thus undergoes reciprocal motion in accordance with the input current applied to the coils C3 and is unimpeded by any mechanical load other than minimal frictional resistance. The housing H3 is shown as being stationarily mounted between a vibration source VS and a mounting surface MS. The actuator is physically connected to the vibration source by means of amount 50 made of rubber or similar material attached to a metal plate 51. If an input signal produced by a suitable feedback control system which senses the vibrations of the vibrating surface is applied to the coils C3, the armature M3 undergoes reciprocal motion in accordance with the input signal. FIG. 5 shows a processing unit PU into which is fed a signal from vibration sensor 100 and which then generates the driving signal to coils C3 in a manner so as to reduce the sensed vibrations. Because the armature has mass, this motion of the armature causes reaction forces to be imparted to the housing H3 due to conservation of momentum. These reaction forces then act so as to prevent the transmission of vibrations between the vibration source VS and the mounting surface MS. Because the armature moves freely, these reaction forces are the same for a given input current regardless of the strength of the vibrational forces produced by the source VS.

In a typical application, the actuator of FIG. 5 can be used to actively control the vibrations produced by an automobile engine and prevent those vibrations from being transmitted to the automobile frame. In that case, the mounting surface MS is the automobile frame while the vibration source VS is the engine. The mount 50 is then a rubber engine mount which secures the engine to the frame.

It should be apparent that the actuator described above with reference to FIG. 5 could also be of the moving coil type. Also, rather than having the armature M3 slidably mounted on the shaft S3, the armature could be stationarily mounted on a slidably mounted shaft as long as there is room at each end of the housing for the shaft to extend when at the limits of its stroke. It should also be appreciated that the armature M3 of the actuator described above, if perturbed from its equilibrium middle position, will oscillate with a certain natural frequency due to the restoring force of the internal magnetic field which causes the armature to seek a position with a flux path of minimum reluctance. This natural frequency is dependent upon the strength of the restoring force and the mass of the armature. Since the frequency response of the actuator depends upon this natural frequency, it may be desireable in certain applications to alter the natural frequency by the addition of internal springs R1 within the housing H3.

In an alternative embodiment, the actuator of FIG. 5 is simply mounted on the vibrating surface VS alone. The reaction forces produced by the actuator then act so as to reduce the vibrations of the surface VS.

Although the invention has been described in conjunction with the foregoing specific embodiment, many alternatives, variations, and modifications will be apparent to those of ordinary skill in the art. Those alternatives, variations, and modifications are intended to fall within the scope of the following appended claims.

What is claimed is:

1. An electromagnetic actuator, comprising:
   a permanent magnet structure mounted on a shaft, the shaft being mounted at each end within a housing constructed of material having high magnetic permeability and open at both ends along the axis of the shaft, and wherein the permanent magnet structure is magnetized in an axial direction;
   a plurality of coils would around a non magnetic bobbin mounted coaxially within the housing, the magnetic structure being situated within the bobbin with each pole of the magnet in close proximity to a coil arranged so that when the coils are energized by an electrical input signal an axial force is applied to the permanent magnet structure in accordance with the polarity and amplitude of the input signal;
   nonmagnetic endcaps at each end of the housing within which are mounted an end of the shaft, the endcaps keeping the magnetic field of the permanent magnet structure directed more perpendicularly toward the coils;
   wherein the coils are electrically connected together so that adjacent coils produce opposing magnetic fields when energized to thereby present a low inductive load to an electrical input signal;
   wherein the coils are located adjacent to each pole of the permanent magnet structure, the dimensions of the coils and permanent magnetic structure being such that the magnetic flux impinging on the coils from the permanent magnet structure remains relatively constant as the magnet structure moves in an axial direction; and
   wherein said permanent magnet structure is a magnet stack which contains one or more coaxially positioned permanent magnets with pole plates at each end of the magnet stack and between each magnet.

2. The actuator as set forth in claim 1 wherein the permanent magnet structure is slidably mounted on the shaft with the latter stationarily mounted within the housing.

3. The actuator as set forth in claim 1 wherein the shaft is slidably mounted within the housing with the permanent magnet structure being stationarily mounted on the shaft.

4. The actuator as set forth in claim 1 further comprising means for driving the actuator with an input signal so as to oppose unwanted vibrations.

5. An electromagnetic actuator, comprising:
   a cylinder mounted coaxially on a shaft mounted at each end within a housing constructed of material having high magnetic permeability and open at both ends along the axis of the shaft;
   a plurality of coils wound around the cylinder;
   an annular permanent magnet corresponding to each coil mounted coaxially on the inner periphery of the housing and magnetized in a radial direction with each permanent magnet positioned in close proximity to a coil and arranged so that when the coils are energized
   by an electrical input signal an axial force is applied to the coils in accordance with the polarity and amplitude of the input signal;
   nonmagnetic endcaps at each end of the housing within which are mounted an end of the shaft, the endcaps keeping the magnetic field of the annular permanent magnets directed more perpendicularly toward the coils;
   wherein the coils are electrically connected together so that adjacent coils produce opposing magnetic fields when energized to thereby present a low inductive load to an electrical input signal; and,
   wherein an annular magnet is located adjacent to each of the coils, the dimensions of the coils and annular magnets being such that the magnetic flux impinging on the coils from the annular magnets remains relatively constant as the coils move in an axial direction.

6. The actuator as set forth in claim 5 wherein the cylinder is slidably mounted on the shaft with the latter stationarily mounted within the housing.

7. The actuator as set forth in claim 5 wherein the shaft is slidably mounted within the housing with the cylinder being stationarily mounted on the shaft.

8. The actuator as set forth in claim 5 further comprising a non-magnetic core occupying the center of the cylinder and with the field coils being separated from each other on the cylinder by a non-magnetic material.

9. The actuator as set forth in claim 5 further comprising means for driving the actuator with an input signal so as to oppose unwanted vibrations.

10. An electromagnetic actuator for active vibration control applications, comprising:
    a housing adapted to be mounted between a vibrating surface and a nonvibrating surface;
    a moving element slidably mounted within the housing;
    means for causing the moving element to undergo reciprocal linear motion in a direction perpendicular to the two surfaces in response to an electrical input signal;
    means for sensing the vibrations of the vibrating surface and generating the electrical input signal fed to the motion causing means in a manner so as to reduce the sensed vibrations; and,
    wherein the motion of the moving element creates reaction forces on the housing due to the mass of the moving element and conservation of momentum which can be used to reduce the vibrations of the vibrating surface.

11. The actuator as set forth in claim 10 further comprising means for mounting the actuator between a vibrating surface and a non vibrating surface.

12. The actuator as set forth in claim 10 further comprising springs within the housing and acting on the moving element so as to alter the natural frequency of vibration of the moving element and thereby also alter the frequency response to the actuator.

13. A system for actively cancelling primary vibrations emanating from a vibration source by generating secondary vibrations, comprising:
    means for sensing residual vibrations remaining after the interaction of the primary and secondary vibrations;

means for generating an electrical signal in accordance with a signal received from the vibrations sensing means in order to drive an actuator in such a manner so as to reduce the sensed vibrations; and, an electromagnetic actuator for producing secondary vibrations comprising:

a permanent magnet structure mounted on a shaft, the shaft being mounted at each end within a housing constructed of material having high magnetic permeability and open at both ends along the axis of the shaft, and wherein the permanent magnet structure is magnetized in an axial direction;

a plurality of coils wound around a non magnetic bobbin mounted coaxially within the housing, the magnetic structure being situated within the bobbin with each pole of the magnet in close proximity to a coil arranged so that when the coils are energized by an electrical input signal an axial force is applied to the permanent magnet structure in accordance with the polarity and amplitude of the input signal;

nonmagnetic endcaps at each end of the housing within which are mounted an end of the shaft, the endcaps keeping the magnetic field of the permanent magnet structure directed more perpendicularly toward the coils;

wherein the coils are electrically connected together so that adjacent coils produce opposing magnetic fields when energized to thereby present a low inductive load to an electrical input signal; and, wherein coils are located adjacent to each pole of the permanent magnet structure, the dimensions of the coils and permanent magnetic structure being such that the magnetic flux impinging on the coils from the permanent magnet structure remains relatively constant as the magnet structure moves in an axial direction.

14. A system for actively cancelling primary vibrations emanating from a vibration source by generating secondary vibrations, comprising:

means for sensing residual vibrations remaining after the interaction of the primary and secondary vibrations;

means for generating an electrical signal in accordance with a signal received from the vibrations sensing means in order to drive the actuator in such a manner so as to reduce the sensed vibrations; and, an electromagnetic actuator for producing secondary vibrations, comprising:

a cylinder mounted coaxially on a shaft mounted at each end within a housing constructed of material having high magnetic permeability and open at both ends along the axis of the shaft;

a plurality of coils wound around the cylinder;

an annular permanent magnet corresponding to each coil mounted coaxially on the inner periphery of the housing and magnetized in a radial direction with each permanent magnet positioned in close proximity to a coil and arranged so that when the coils are energized by an electrical input signal an axial force is applied to coils in accordance with the amplitude and polarity of the input signal;

nonmagnetic endcaps at each end of the housing within which are mounted an end of the shaft, the endcaps keeping the magnetic field of the annular permanent magnets directed more perpendicularly toward the coils;

wherein the coils are electrically connected together so that adjacent coils produce opposing magnetic fields when energized to thereby present a low inductive load to an electrical input signal; and, wherein an annular magnet is located adjacent to each of the coils, the dimensions of the coils and annular magnets being such that the magnetic flux impinging on the coils from the annular magnets remains relatively constant as the coils move in an axial direction.

* * * * *

UNITED STATES PATENT AND TRADEMARK OFFICE
CERTIFICATE OF CORRECTION

PATENT NO. : 5,231,336
DATED : July 27, 1993
INVENTOR(S) : Frederik T. van Namen It is certified that error appears in the above—identified patent and that said Letters Patent is hereby corrected as shown below:

Column 4, line 21, change "S1" to --S1.--.

Column 7, line 21, change "would" to --wound--.

Signed and Sealed this

Fifteenth Day of March, 1994

Attest:

BRUCE LEHMAN

*Attesting Officer*　　　*Commissioner of Patents and Trademarks*